United States Patent
Sharma

(10) Patent No.: US 10,649,708 B2
(45) Date of Patent: May 12, 2020

(54) METHOD AND SYSTEM FOR MULTI-MODE DATA OBJECT TRANSFORMATION AND DELIVERY

(71) Applicant: Paymentus Corporation, Charlotte, NC (US)

(72) Inventor: Dushyant Sharma, Waxhaw, NC (US)

(73) Assignee: Paymentus Corporation, Charlotte, NC (US)

( * ) Notice: Subject to any disclaimer, the term of this patent is extended or adjusted under 35 U.S.C. 154(b) by 0 days.

(21) Appl. No.: 15/948,120

(22) Filed: Apr. 9, 2018

(65) Prior Publication Data

US 2018/0293036 A1    Oct. 11, 2018

Related U.S. Application Data

(60) Provisional application No. 62/483,061, filed on Apr. 7, 2017.

(51) Int. Cl.
*G06F 3/12* (2006.01)
*G06Q 10/08* (2012.01)
*G06F 16/93* (2019.01)

(52) U.S. Cl.
CPC .......... *G06F 3/1268* (2013.01); *G06F 3/1205* (2013.01); *G06F 3/1264* (2013.01); *G06F 16/93* (2019.01); *G06Q 10/0833* (2013.01)

(58) Field of Classification Search
None
See application file for complete search history.

(56) References Cited

U.S. PATENT DOCUMENTS

| | | | |
|---|---|---|---|
| 6,701,315 B1 * | 3/2004 | Austin | H04L 67/306 |
| 7,483,956 B2 * | 1/2009 | Denney | G06Q 10/10 358/1.15 |
| 8,600,904 B1 * | 12/2013 | Schneider | G06Q 30/00 705/330 |
| 2001/0042047 A1 * | 11/2001 | Nishida | G06Q 10/087 705/51 |
| 2002/0023055 A1 * | 2/2002 | Antognini | G06K 1/121 705/40 |
| 2003/0107757 A1 * | 6/2003 | Gupton | G06Q 10/10 358/1.15 |
| 2004/0215480 A1 * | 10/2004 | Kadaba | B07C 3/00 705/338 |
| 2014/0250163 A1 * | 9/2014 | Schneider | H04L 51/34 709/202 |

* cited by examiner

*Primary Examiner* — Miya J Williams
(74) *Attorney, Agent, or Firm* — Alston & Bird LLP

(57) ABSTRACT

Methods, apparatus, and computer program products directed to the multi-mode delivery of documents are provided. Example embodiments implement the transformation and delivery of data objects for use in connection with parallel delivery topologies and pathways to overcome technical challenges associated with the accuracy, reliability, scalability, and efficiency of conventional document delivery approaches.

20 Claims, 4 Drawing Sheets

METHOD AND SYSTEM FOR MULTI-MODE DATA OBJECT TRANSFORMATION AND DELIVERY

CROSS REFERENCE TO RELATED APPLICATION

This application claims the benefit of U.S. Provisional Patent Application Ser. No. 62/483,061, which was filed on Apr. 7, 2017 and entitled "Method and System for Multi-Mode Data Object Transformation and Delivery."

TECHNICAL FIELD

An example embodiment relates generally to data object transformation and delivery, particularly in the context of the use of parallel delivery topologies and pathways in connection with coordinated tracking mechanisms to allow for improved accuracy, reliability, and efficiency in data object delivery and processing.

BACKGROUND

Despite advances in the reliability and security of electronic content and other data delivery mechanisms, many modern entities still rely on the physical printing and delivery of important documents. The processes involved with the printing, preparation, and delivery of such documents are often inefficient, particularly in situations where large volumes of customized documents must be prepared on a recipient-by-recipient basis. Such processes also raise a number of technical challenges associated with tracing and tracking the physical document as it moves between and amongst multiple entities en route to and from a recipient.

While some document sources allow for a recipient to view and interact electronically with a given document, such electronic interaction raises a number of technical issues, particularly in situations where electronic and physical versions of documents coexist, where harmonization and/or reconciliation of such versions is required, and where the ability to trace or track a given document in its various versions is necessary. The inventor of the invention disclosed herein has identified these and other technical challenges, and developed the solutions described and otherwise referenced herein.

BRIEF SUMMARY

A method, apparatus and computer program product are therefore provided in accordance with an example embodiment in order to provide methods, apparatuses, and/or systems that enable comprehensive document delivery and response systems that combine and reconcile traceable and trackable physical document delivery and response processes and mechanisms with traceable and trackable electronic delivery and response processes and mechanisms. Some example implementations contemplate the extraction and conversion of document information into a request data object that may include a generated document image and formatted, extracted document data. In some such example implementations, the physical version of the document can be supplied, along with the request data object, to a delivery agent where the document is physically delivered in parallel with the presentation of the document image and/or extracted document data to a recipient. In some such example implementations, a recipient's response to the document may be received either electronically or physically by a delivery agent and/or a separate processing entity, which in reconciles the received response and processes the recipient's response in accordance with rules established by the request object source, delivery agent, and/or processing entity.

BRIEF DESCRIPTION OF THE DRAWINGS

Figure 1:
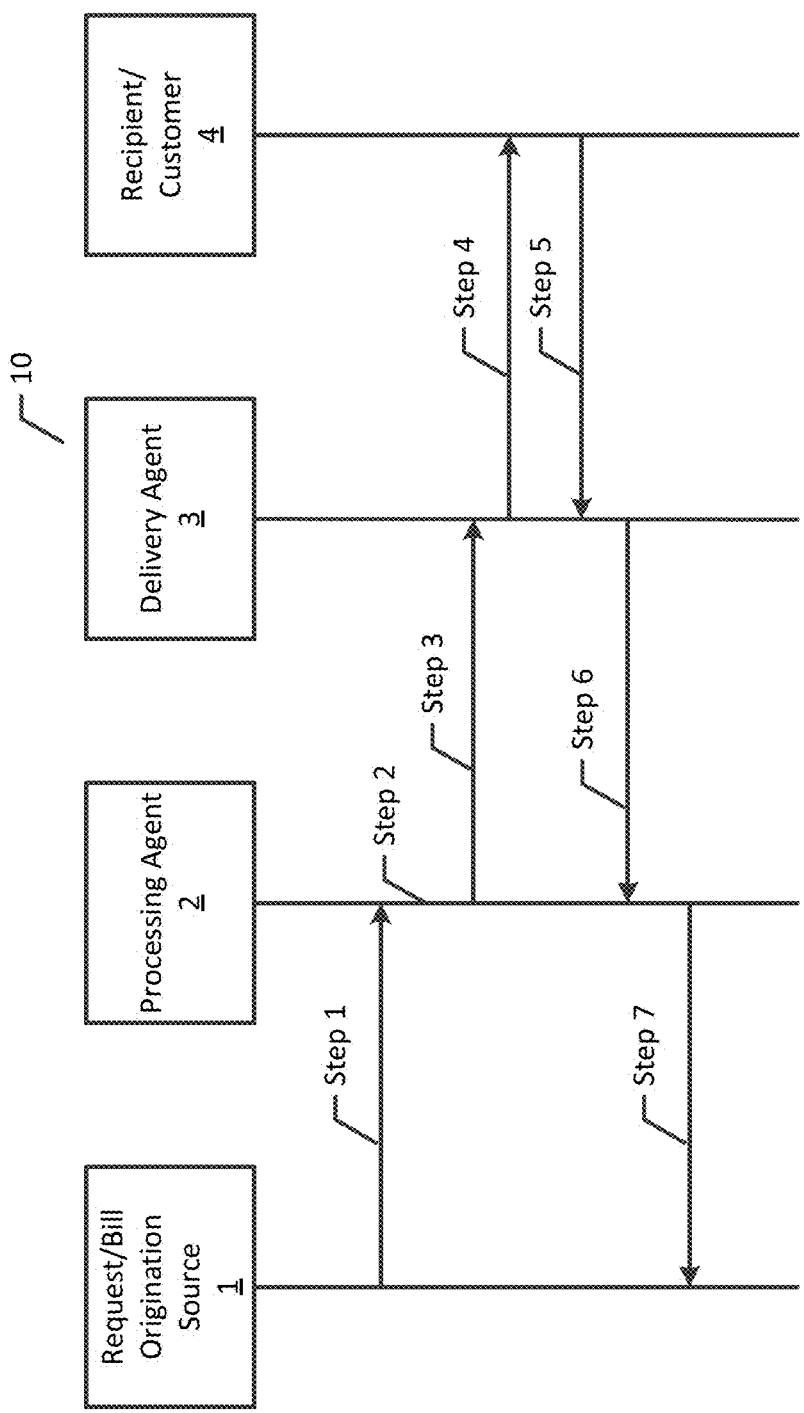
Figure 2:
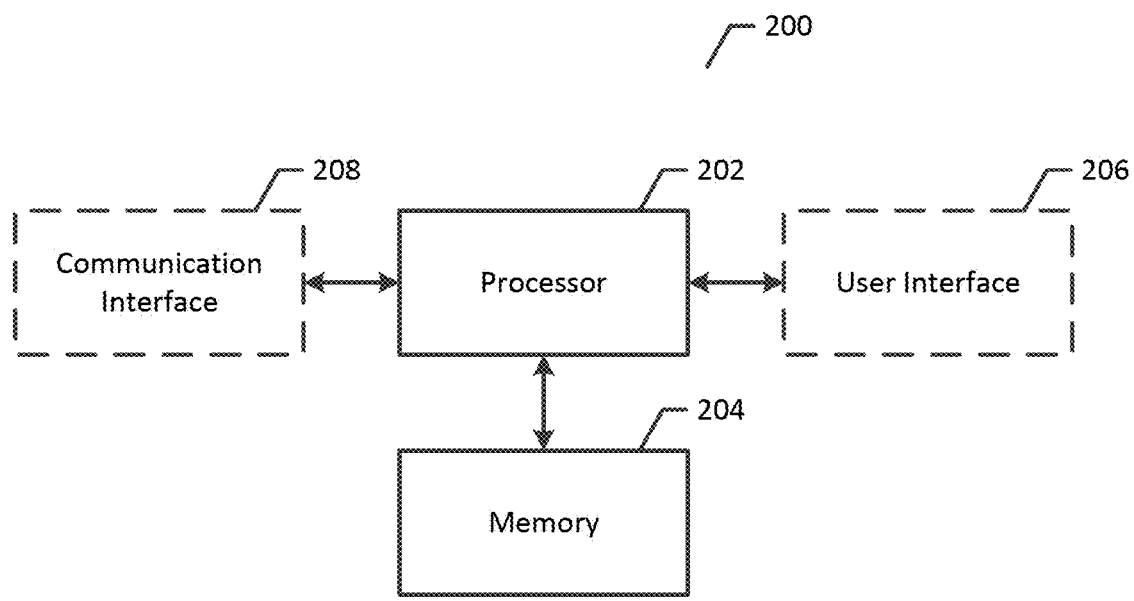
Figure 3:
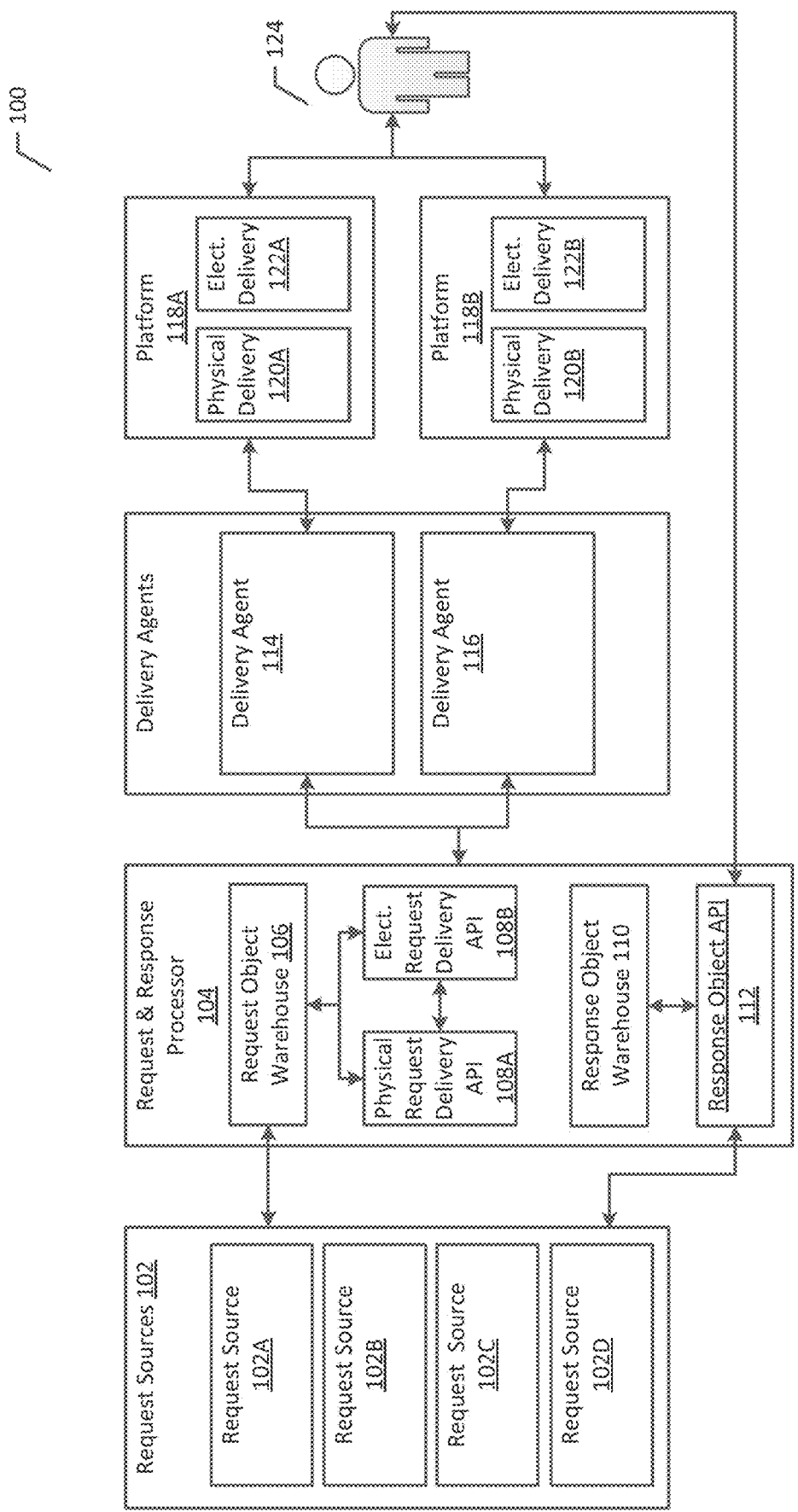
Figure 4:
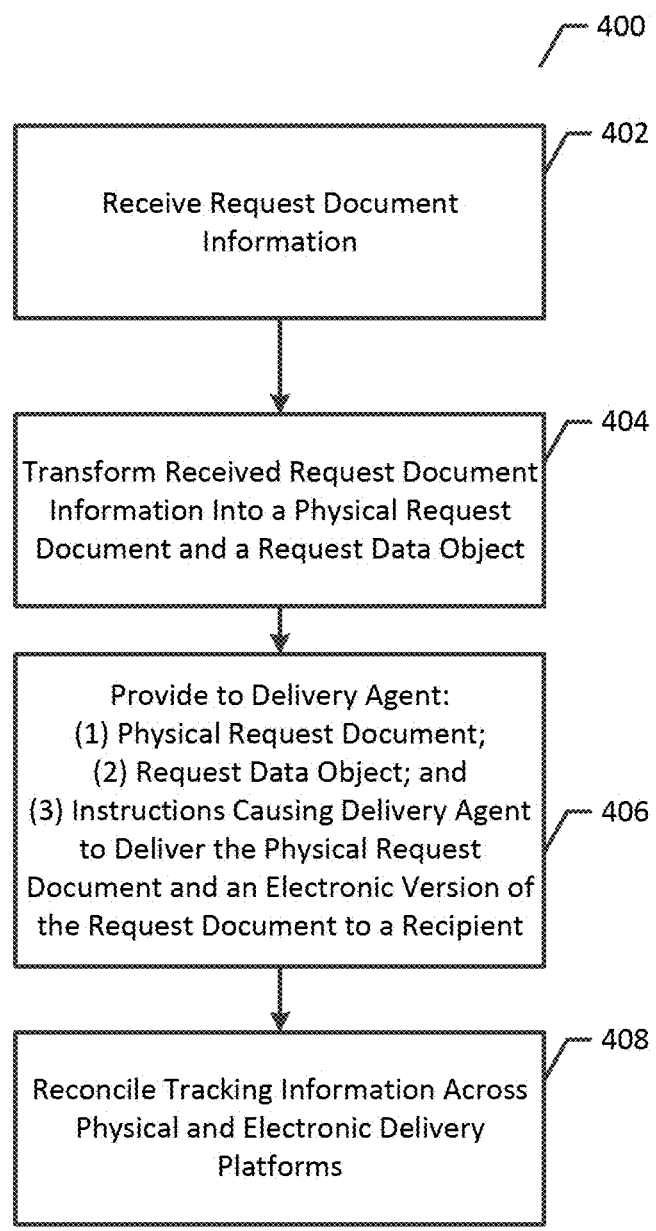

Having thus described certain example embodiments of the present disclosure in general terms, reference will hereinafter be made to the accompanying drawings, which are not necessarily drawn to scale, and wherein:

FIG. 1 depicts an example message flow that illustrates aspects of an example embodiment of the present invention;

FIG. 2 is a block diagram of an apparatus that may be specifically configured in accordance with an example embodiment of the present invention;

FIG. 3 is a block diagram that illustrates aspects of an example embodiment of the present invention; and FIG. 4 is a flowchart illustrating a set of operations performed, such as by the apparatus of FIG. 2, in accordance with an example embodiment of the present invention.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with example embodiments in order to enable comprehensive document delivery and response systems that combine and reconcile traceable and/or otherwise trackable physical document delivery and response processes and mechanisms with traceable and/otherwise trackable electronic delivery and response processes and mechanisms. Many implementations of example embodiments of the invention described and otherwise disclosed herein are directed to solving the technical challenges associated with the use of separate delivery paths and/or mechanisms to effect the physical and electronic delivery of a document and the routing of a recipient-generated response to the delivered document.

Example implementations of embodiments of the invention may be used in a wide array of situations and contexts where the tracking of a document sent in physical and electronic form to an intended recipient may be advantageous. Some such example implementations also contemplate the tracking of a response to the document and the harmonization and/or reconciliation of records associated with the document and its response. In some such situations and contexts, the document and/or related data may be combined and configured into a request data object that can be structured for use by potentially disparate and typically incompatible systems.

One set of example implementations arises in the context of delivering and tracking bills and/or other documents that contain a request for a response from a recipient. Some example implementations that arise in such contexts are aimed toward combining an electronic payment platform (including but not limited to advanced payment platforms that may exhibit enhanced security features and/or communications capabilities) with one or more multifaceted delivery networks, such as those that may be controlled by one or more large online retailers, in order to improve the efficiency of bill delivery and payment collection. Specifically, the invention contemplates establishing a comprehensive bill delivery and payment environment that combines a fully trackable and traceable physical bill delivery mechanism with a fully trackable and traceable digital (or otherwise electronic) bill delivery and payment mechanism.

In general, most bill payment environments include four main sets of actors or entities: (1) one or more bill origination sources; (2) a processing agent; (3) one or more delivery agents; and (4) the customers or other entities required to pay the bills. Traditionally, a bill origination source is a service provider, such as a utility company, media company, tradesman, hospital or other service provider that sends one or more bills (on a periodic basis and/or on a one-time basis) to a customer. In accordance with traditional approaches to bill delivery and payment, each individual bill origination source periodically causes physical, paper bills, to be printed, placed in envelopes, and mailed (either through the U.S. Postal Service or a private carrier) to each customer. After receiving the bill, the customer may submit payment to a processing agent in the form of a check, electronic transfer, payment-by-phone, or other method. After payment is received by the processing agent, funds can be directed to the bill origination source and the customer's account may be updated to reflect the receipt of payment.

This traditional bill payment delivery model is inherently inefficient, and places the burden of those inefficiencies on the two entities that are least able to address them, namely, the bill origination sources and the customer. With respect to the bill origination sources, the traditional model requires each source to expend significant resources on the periodic printing and mailing of bills. These printing and mailing costs are significant, and even small increases in unit costs (such as an increase in the postal rate) rapidly become significant when multiplied by the number of bills that are sent every cycle. Moreover, since the billing and bill printing systems used by each bill origination source vary from source to source (and because each source is typically only focused on billing its own customers) bill origination sources are typically unable to scale the bill printing and delivery process beyond the size of each source's individual customer base. Further compounding the issues associated with bill delivery is the lack of traceability associated with traditional mailing methods. While the postal service is generally reliable in the aggregate, typical mailing procedures used with bills do not provide a trackable, traceable path through which the movement of a bill from source to customer can be verified. As such, the traditional model results in a situation where a bill origination source must regularly expend significant resources to send bills that it cannot guarantee will arrive to the customer in a timely manner (if at all).

From the perspective of the customer, the traditional bill delivery and payment model is also inefficient in several ways outside of the customer's control. Since each bill origination source prepares and mails their own bills on their own, individual schedules, the multiple bills for which a customer is responsible for in a given month (such as a credit card bill, various utility bills, bills for other services, etc.) arrive irregularly throughout the month. This places several burdens and inefficiencies on the customer, including but not limited to: (1) the need to constantly monitor their incoming mail to confirm that each expected bill has arrived; (2) the need to pay bills individually or in small groups as they arrive to avoid late payment; and (3) the need to regularly monitor accounts to confirm that payment was ultimately received. Moreover, since bills are typically mailed in an untraceable manner, and payments are often mailed in a similarly untraceable manner, the customer has no ability to prove that a bill that was lost or delayed in transit to the customer was not timely received, and likewise has no ability to prove that a payment that was lost or delayed in transit was sent by the customer in a timely manner.

Technical Challenges Solved by the Invention

To address these and other inefficiencies and other issues associated with the traditional bill delivery and payment model, the inventor has recognized and overcome at least the following technical challenges:

Interoperability of Incompatible Systems: As noted above, each bill origination source uses its own system and/or approach to house and store the data associated with a given bill (such as customer names, addresses, and identification information, amounts owed, goods and/or services provided, etc.). Each bill origination source typically also has its own preferred format in which it arranges and presents the bill information in the physical, printed bill. Even in situations where a bill origination source provides information to a commercial printer in a print stream, each commercial printer typically imposes its own requirements on the formatting and arrangement of data within that print stream, such that print stream designed for one printing system is incompatible with that of another printing system. Further compounding these interoperability issues is the general incompatibility of the data forms and formats associated with printing of bills and the computing systems used by customers (such as to view images and data via an online interface) and/or the online interfaces uses by large retailers to interact with their customers and customer accounts.

Harmonization of Physical and Electronic Processes: As described in more detail below, the invention contemplates a combined physical and electronic bill delivery and payment system. As such, technical challenges arise in ensuring that bills and payments sent physically (such as through a delivery network) or electronically (such as through an online bill viewing and payment interface) can be traced, tracked, reconciled, and/or otherwise audited in a manner that ensures that events that occur in physical space can be recorded electronically, and, where necessary, where events that occur electronically, are reflected in a physical record.

Data Security and User Authorization: Particularly in instances and embodiments that involve potentially sensitive information (such as account numbers, personal information, and/or otherwise non-public information) that is implicated in the electronic bill delivery and/or payment process, technical challenges arise in ensuring that such data is moved securely between and amongst entities, and that unauthorized individuals are unable to access or interact with such information.

Aspects of the Invention and Example Implementation

Embodiments of the invention contemplate a bill delivery and payment system wherein parallel, harmonized physical and electronic pathways are used to provide customers with bills (and a mechanism to pay such bills) that is fully trackable and/or otherwise traceable. In general, in embodiments of the invention, bill information from multiple bill origination sources is received by a processing agent. The processing agent reformats the received data into data objects that can be passed to a delivery agent in a manner that allows for both the physical delivery of the bill and the electronic delivery of the bill through an online interface associated with the delivery agent. Upon receipt of the bill (either through physical delivery and/or viewing via the online interface, the customer pays the bill, either through submission of a check, other physical tender, or other electronic communication with the processing agent, or through interaction with the delivery agent's interface (which subsequently allows for payments to be processed by the processing agent. Upon payment of the bill, the processing agent causes the records associated with the customer to be updated at the bill origination source and the delivery agent.

In operation, and with reference to the example message flow 10 in FIG. 1, some example implementations of the invention contemplate a process that starts at step 1, where the request origination source (which, for the purposes of clarity, may be referenced as a bill origination source, for example) provides to the processing agent an electronic copy of the billing information for all of the physical bills that need to be sent within a particular time frame. This information can be provided in a number of different forms and/or formats. For example, in some example implementations, a bill origination source may provide the processing agent with database records extracted from the bill origination source's customer database. Such records may include, for example, the bill data (such as the bill amount, billing history, invoice information, billing narrative, and/or other information, for example), customer data (such as customer name, address, identification number, and/or other customer information, for example), and payment data (such as payment terms, accepted payment methods, payment history, and/or other payment-related information, for example). In other example implementations, the relevant information may be provided in the form of a print stream, such as formatted data stream configured for use with a particular printer to enable the high-speed printing of multiple bills.

Upon receipt of the electronic billing information, the processing agent prints the bills and prepares them for mailing to the individual customer and for electronic transmission to the delivery agent, as shown at step 2. At step 2, the processing agent extracts and formats the billing data received from the bill origination source to form a number of bill-and-customer-specific data objects. At this stage, there are generally two different approaches that can be taken in example implementations of the invention. In the first approach, the processing agent is responsible for the physical printing and packaging of the bills. In example implementations in accordance with the first approach, the processing agent used the received bill information (such as either the extracted database records and/or the print stream data) to print a physical copy of the bill and an address card to be used in connection with the bill. As part of this process, the bills may be associated with one or more digital stamps. Such digital stamps confer the right to convey the bill using the distribution network associated with the delivery agent. In some situations, a digital stamp may also serve as an authentication token or other indication of authenticity, as each individual digital stamp may be associated with its corresponding bill.

In addition to physically printing the bills and/or address cards, the processing agent also prepares the bill-and-customer-specific request data object. In some example implementations, the data object may include: (1) an image file (such as PDF formatted file, for example) of the bill, (2) a set of bill metadata (which may include, for example, information about the source of the bill, relevant date information, extracted text, and/or other metadata), (3) a set of actionable data (which may include, for example, a due date, customer address, return address, and/or other information that may be necessary to take action with respect to the bill), and/or (4) a set of user preference data (which may include, for example, customer-specific data stored and/or otherwise accessible by the processing agent, such as whether a particular customer prefers electronic or physical bill delivery, timing and/or delivery preferences, such as whether a customer wishes to receive all physical bills in a single package, for example, and/or other user preference data).

In accordance with the second approach, the processing agent may not be responsible for the printing of the physical bills, and therefore only passes the data objects to the delivery agent, who may then print the bills for physical delivery to the customer. In some such example implementations, the data object may further include print stream data and/or other additional information to facilitate the printing of the bills by the delivery agent. It will be appreciated that, regardless of whether a bill is physically printed (either by a processing agent, a delivery agent, or at all) each data object may be associated with a digital stamp to allow for the tracking and authentication of a bill.

After the bills and their related data objects are prepared by the processing agent and associated with their respective digital stamp(s), the bills are transferred at step 3 from the processing agent to the delivery agent. In some instances, this comprises physically providing the set of bills and/or address cards to the delivery agent, or otherwise placing the bills into an entry point of the relevant delivery network. This also includes providing the data objects to the delivery agent, such that the customer may be able to access and/or view the bill from an online portal associated with the delivery agent.

Upon receipt of the bills, the delivery agent, through the operation of the delivery network, delivers the bills at step 4 to their respective intended recipients. In situations where the bill is preprinted by the processing agent, this involves the physical delivery of the bills in a trackable manner. The customer then pays and returns the received bill, as shown at step 5. In instances where the customer is provided with a digital stamp that allows them to use the delivery network of the delivery agent to send the payment, the delivery agent can then, at step 6, pass the payment back to the processing agent, who processes the payment, and as shown at step 7, notifies the bill origination source, and otherwise facilitates the relevant transfer of funds. In some instances, such as when the bill is viewable and payable via an online portal associated with the delivery agent, the payment may be provided to the delivery agent, who may then work with the processing agent to facilitate the relevant transfer of funds.

In some situations, the invention will may be implemented as an extension of an online retailer's website and/or related applications. For example, several large, online retailers currently operate delivery networks that allow them to efficiently move goods from one place to another and simultaneously offer electronic interfaces through which individual customers can pay for goods and services and access other content. Some large physical retailers also maintain an online presence that allows users to purchase goods online and/or in a retail location. Some payment processing agents are capable of efficiently processing large volumes of payment transactions on behalf of entities that bill customers on regular, periodic intervals. Consequently, such a payment processing entity may receive electronic billing information from multiple service providers, print the bills, and, through the use of digital stamps, place the bills into a retailer's delivery network for delivery to customers. In some situations, the customer may pay the bills by logging into the customer's account associated with the online retailer and paying one or more bills through that retailer's payment interface. Alternatively, particularly in the case where the customer prefers to pay by check, the customer may place the payment into the retailer's return delivery network, which may allow for the retailer, which is the delivery agent in some examples, to use its delivery and return shipping network to retrieve the payment from the customer and deliver the check or other payment slip to the payment processing agent for processing.

Particularly in situations where one or more digital stamps are associated with the bill and its corresponding payment, the bill and its payment can be tracked, such that disputes about whether a bill was delivered and a payment made can be verified by checking the status and/or location of the digital stamp. Alternatively, such as when a customer interfaces directly with the payment processing agent or authorizes a transaction with a digital wallet stored with the processing agent, the digital stamp may be used to both identify the particular bill to be paid and serve as an indication that the customer paid the particular bill associated with the digital stamp.

Many aspects of the invention can also be performed through the use of a series of APIs. For example, upon receipt of the billing information from the bill origination sources, the processing agent may use a series of retailer-specific billing APIs and electronic billing APIs to facilitate the passing of information necessary to accomplish the tracked, physical delivery of the bills to the customer and the tracked delivery of the relevant data objects from the payment processing agent to the delivery agent/retailer. The delivery agent/retailer may use electronic billing APIs and/or other aspects of its online interface to facilitate the presentation of an image of the bill, relevant bill information, and/or other bill-related data to the customer. In some instances, this functionality may incorporate authentication procedures associated with the delivery agent's (such as a retailer's) online interface and/or incorporate additional authentication protocols. The customer may then initiate an electronic payment that may appear to the customer to be at least cosmetically and procedurally equivalent to making a purchase through the retailer's online interface. Through the operation of one or more electronic payment APIs, the processing agent may receive the payment information either directly from the customer or indirectly from the retailer, and pass the payment information (and funds) to the bill origination source. The processing agent may also update data records associated with the customer and push those updated records to the bill origination source, the retailer, and/or the customer.

In connection with the approaches to enable comprehensive document delivery and response systems that combine and reconcile traceable and trackable physical document delivery and response processes and mechanisms with traceable and trackable electronic delivery and response processes and mechanisms, some example implementations of embodiments of the invention contemplate the use and interaction with one or more network entities and interfaces. In this regard, automatically transforming, processing, and facilitating the delivery of physical and electronic versions of documents to a user and processing responses to such versions can be accomplished by an apparatus 200 as depicted in FIG. 2. The apparatus may be embodied by and/or incorporated into one or more devices, servers, or systems associated with any of the entities discussed herein, including but not limited to those associated with a processing agent and/or a delivery agent. Alternatively, the apparatus 200 may be embodied by another device, external to such devices, servers, and/or systems. For example, the apparatus may be embodied by a computing device, such as a personal computer, a computer workstation, a server or the like, or by any of various mobile computing devices, such as a mobile terminal, (such as a smartphone, a tablet computer, or the like, for example). In some example implementations, it may be particularly advantageous to implement the apparatus 200 in connection with one or more network elements and/or functions associated with a payment processing agent.

Regardless of the manner in which the apparatus 200 is embodied, the apparatus of an example embodiment is configured to include or otherwise be in communication with a processor 202 and a memory device 204 and optionally the user interface 206 and/or a communication interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (such as a computer readable storage medium, for example) comprising gates configured to store data (such as bits, for example) that may be retrievable by a machine (such as a computing device like the processor, for example). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (such as chips, for example) including materials, components and/or wires on a structural assembly (such as a baseboard, for example). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (such as by being physically embodied in circuitry, for example) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (such as a pass-through display or a mobile terminal, for example) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 200 may optionally include a user interface 206 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (such as software and/or firmware, for example) stored on a memory accessible to the processor (such as memory device 204, and/or the like, for example).

The apparatus 200 may optionally also include the communication interface 208. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

As noted herein, many implementations of example embodiments of the invention described, contemplated, and/or otherwise disclosed herein are directed to solutions that enable document delivery and response systems that combine and reconcile traceable and trackable physical document delivery and response processes and mechanisms with traceable and trackable electronic delivery and response processes and mechanisms. As such, some example implementations are presented below to clarify how aspects of such example embodiments may be advantageous in certain situations. It will be appreciated that, while many of the following examples refer to a specific entities and identify certain operations that may be performed by such entities, it should be appreciated that such references are done for the purposes of clarity, and example implementations conforming to those examples presented herein and/or otherwise contemplated by the invention disclosed herein may be performed in connection with other network entities, alone or in combination with one or more additional network entities, without departing from the spirit and/or scope of the invention disclosed herein.

FIG. 3 is a block diagram of a portion of an example system environment 100 in which implementations in accordance with an example embodiment of the present invention may be performed. As shown in FIG. 3, example environment 100 includes a set of request sources 102, a request and response processor 104, one or more delivery agents (shown as delivery agent 114 and delivery agent 116 in FIG. 3), each of which are associated with their respective platforms 118, through which the delivery agents 114, 116 may interact with an intended recipient 124.

As shown in FIG. 3, multiple request sources 102a-102d may be present in example environment 100. In many example implementations, each request source 102a-102d may be mutually independent from the other request sources, and each may be capable of developing a request to be conveyed to the intended recipient 124. In some such example implementations, each request source will be a service provider, business, and/or other entity that intends to send a bill for goods, services, and/or other resources to the intended recipient 124. For example, any of request sources 102a-102d may be a utility company, municipality, service provider, retailer, artisan, craftsperson, tradesperson, and/or any other entity that tends to send bills or other requests to an intended recipient.

In some example implementations, rather than directly print and mail a physical bill to the intended recipient, a request source 102 may provide a set of billing and/or other request information to a request and response processor 104. In some example implementations, request and response processor 104 may be an entity (or group of entities working together) that is capable of receiving request information from a request source, transforming the request information into physical and electronic versions of a document that can be viewed and read by a human intended recipient, and process one or more responses received back from the intended recipient, such as a payment and/or other data set. As noted in connection with FIG. 1, the request data (which may be billing data, for example) received from the request source may take any of a number of forms, including but not limited to print stream data, database records, spreadsheets, and/or other data formats. Regardless of the format in which the information is received, the request information may be received by the request and response processor 104. In some example implementations, the request information may be received directly by a request object warehouse 106, which may include one or more servers and/or databases, and may also, in some example implementations, include space in which request information received from a request source 102.

In some example implementations, one or more application programing interfaces (APIs) may be used in connection with the receipt of the request data. Two example APIs which may be associated with the receipt, transformation, and/or other processing of the request data may are depicted in FIG. 3 as physical request delivery API 108a (which may, for example be configured to convert received request data into a format that can be printed and/or otherwise effect the production of a physical document that contains the request data), and electronic request delivery API 108b (which may, for example, be configured to convert the received request data into a data object that may be stored in connection with the request object warehouse 106 and/or provided to one or more delivery agents 114, 116). Regardless of whether APIs are used or some other approach is taken, the request and response processor 104 receives the request data from a request source 102 and transforms the data in at least two ways: (1) the production of a physical copy of the request document, and (2) the creation of a request data object. It will be appreciated that, in many example implementations, the look and format of the physical document may be dictated by rules established by the request source (such as the use of particularized fonts, logos, arrangements of text and images, and the like, for example). It will also be appreciated that any of the data, metadata, and/or other information discussed herein, including but not limited to the information included in the data object(s) discussed in connection with FIG. 1, may be included in the request data object produced by the processor 104.

It will be appreciated that the production of the physical documents and the data objects will typically involve the processing and development of large volumes of data under time constrained conditions. Moreover, in many example implementations, such as those involving the delivery of bills, for example, each physical document and its corresponding data object will be recipient-specific, at least in the sense that they are likely to include information (such as recipient name, address, bill amount, and related content) that is specific to a particular intended recipient).

After the physical documents and data objects are prepared, they may be provided to one or more delivery agents (which may include, for example, the online retailers and/or physical retailers with online presences referenced herein, for example). As shown in FIG. 3, each delivery agent 114, 116 is associated with a platform 118a, 118b, respectively. Each delivery platform 118 includes a physical delivery component 120 and an electronic delivery component 122. In some example implementations, the physical delivery component may take the form of a delivery network, for example, such as a delivery network that uses common carriers, proprietary carriers, and/or other agents to effect the delivery of physical items to an intended recipient 124. In some example implementations, the electronic delivery component 122 may take the form of a webpage, application interface, and/or other interface through which an intended recipient may view and acquire information (including but not limited to recipient-specific information). In some example implementations, the electronic delivery component may involve a user account, wherein a user may provide authentication credentials (such as a user name, password, or other authentication information) to access a portion of an online interface that is specific to the intended recipient 124.

As discussed in connection with FIG. 1, some example implementations of embodiments of the invention contemplate that user may receive a physical copy of a request document (such as a bill) and/or view a copy of the bill online. For example, a delivery platform may receive the request data object from the processor 104 and extract from that data object an image of the bill document, billing information (such as the identity of the intended recipient, the amount owed, and/or any other information that may be advantageous in routing the bill to the correct recipient and/or providing information associated with the bill or other request to the recipient, for example). Upon extracting the relevant information from the request data object, one or more relevant delivery agent 114, 116 may present, via the electronic delivery component 122 of a platform 118, an electronic version of the bill and/or bill information.

Upon physical and/or electronic receipt of the bill and/or other request, the intended recipient 124 may pay the bill and/or otherwise respond. In some example implementations, the payment information may be provided via an API and/or other interface associated with the delivery agent. In some such example implementations, the process of effecting payment of a bill may appear to a user to be cosmetically and/or procedurally similar to the process used to make a purchase from the retailer. In some such example implementations, the payment information received by the delivery agent may be passed back to the processor 104, where the payment may be processed (such as through the operation of a response object API 112 and/or response object warehouse 110), and the request source 102 may be provided information and/or funds indicating that the recipient has paid the bill or otherwise satisfied the request. In some example implementations, the intended recipient may interact with the processor 104 directly, such as through the operation of a response object API 112, response object warehouse 110, a secure payment portal (not shown) and/or other interaction with the processor 104. In some example implementations, the intended recipient may provide a physical response, such as a return document (a check, for example) which may be routed via the delivery agent 114, 116, and/or directly to the processor 104.

Regardless of the precise paths in which a bill and/or other request pass to reach the intended recipient and through which the response from the recipient may pass, it will be appreciated that the processor and/or an entity working in conjunction with the processor is able to reconcile tracking information associated with the physical and electronic delivery and response. For example, as tracking information for the physical document becomes available, such as from a physical delivery network 120, for example, the processor 104 and/or delivery agent 114, 116 may update the records associated with the electronic version of the bill to reflect whether the physical copy has been delivered to the recipient. Likewise, when a response to a user is received (either electronically, such as through a payment interface, and/or physically, such as through the receipt of a check, or the entry of an envelope bearing a trackable label into the return delivery network of a delivery agent, the records associated with the physical and electronic versions of the document may be updated. In some example implementations, such updates may occur in real time or near-real time.

Referring now to FIG. 4, the operations performed by the apparatus 200 of FIG. 2 in accordance with an example embodiment of the present invention are depicted as an example process flow 400. In this regard, the apparatus includes means, such as the processor 202, the memory 204, the user interface 206, the communication interface 208 or the like, for receiving request document information, transforming the request document information into a physical request document and a request data object, providing the physical request document, request data object, and instructions regarding the delivery of the request document and request data object to a recipient, and reconciling tracking information across physical and electronic delivery platforms.

The apparatus includes means, such as the processor 202, the memory 204, the user interface 206, the communication interface 208 or the like, for receiving request document information. With reference to FIG. 4, process flow 400 may commence at block 402, which includes receiving request document information. The request document information may take the form of any such information discussed and/or otherwise contemplated herein, including but not limited to print stream data, database records, other data records, and/or the like. In some example implementations, it may be advantageous to allow for the electronic delivery of such information, such as the secure electronic delivery that may be effected between a secure payment processing platform and a data source and/or through the use of other electronic data delivery approaches.

The apparatus also includes means, such as the processor 202, the memory 204, the user interface 206, the communication interface 208 or the like, for transforming the received request document information into a physical request document and a request data object. With reference to FIG. 4, process flow 400 may continue to block 404, which transforming the received information into a physical document and a request data object. As noted herein, some example implementations of embodiments of the invention contemplate the parallel physical and electronic delivery of documents such as bills and/or other requests, such that an intended recipient can receive a physical copy while interacting with and/or otherwise responding to the document in an electronic manner. As such, some example implementations of block 404 will be performed by a processing agent or other processor, such as entity 2 in FIG. 1 or the processor 104 in FIG. 3, for example which are capable of producing physical documents and electronic data objects.

The apparatus also includes means, such as the processor 202, the memory 204, the user interface 206, the communication interface 208 or the like, for providing the physical request document, request data object, and instructions causing the delivery of the request document and request data object to an intended recipient. With reference to FIG. 4, process flow 400 may proceed to block 406, which includes providing the physical and electronic versions of the request document to a delivery agent with instructions regarding delivery to an intended recipient. In some example implementations, this may comprise placing the physical copies into an intake of the physical delivery network associated with the delivery agent and providing instructions (either embedded into the request data object and/or separately therefrom) for the presentation of portions of the request data object to the intended recipient via an interface associated with the delivery agent.

The apparatus also includes means, such as the processor 202, the memory 204, the user interface 206, the communication interface 208 or the like, for reconciling tracking information across physical and electronic delivery platforms. With reference to FIG. 4, process flow 400 may proceed to block 408, where physical and electronic tracking information may be reconciled. As discussed herein, many example implementations of embodiments of the invention are aimed towards ensuring that the records associated with a given request are updated to reflect the current status of the delivery and response process. As such, when a change in status (such as a movement from one location to another, a completion of a data processing step, a detected viewing and/or interaction via an electronic interface by the user, and/or other changes or interactions associated with a document) is detected, data records associated with both the electronic version of the document and the physical version of the document may be updated. Such updates may occur in real time and/or near-real time with respect to the detection of the change in status.

As described above, FIGS. 1, 3, and 4 illustrate block diagrams, message flows and flowcharts of an apparatus 200, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 204 of an apparatus employing an embodiment of the present invention and executed by the processor 202 of the apparatus. As will be appreciated, any such computer program instructions may be loaded onto a computer or other programmable apparatus (such as hardware, for example) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for multi-mode document delivery, the method comprising:
   receiving, from a request source, a set of document information associated with an intended recipient;
   associating the set of document information with a digital stamp, the digital stamp operable to confer at least one of a right to print and deliver a physical document to the intended recipient and a right to transmit a digital version of the physical document to the intended recipient;
   reconciling a set of tracking information in at least one of a physical delivery platform or an electronic delivery platform, wherein the set of tracking information comprises at least an authentication token associated with the digital stamp, the digital stamp being associated with the set of document information and a corresponding communication of one of the physical document or the digital version of the physical document;
   in an instance in which the digital stamp confers the right to print and deliver a physical document to the intended recipient, based at least in part on the set of document information associated with the intended recipient, printing the physical document and providing the physical document to the physical delivery platform for delivery to the intended recipient; and
   in an instance in which the digital stamp confers the right to transmit the digital version of the physical document to the intended recipient, based at least in part on the set of document information associated with the intended recipient, generating a request data object comprising an image of the physical document and transmitting the request data object to the electronic delivery platform for delivery to the intended recipient.

2. The method of claim 1, wherein one or both of the physical delivery platform and the electronic delivery platform is associated with a first delivery agent.

3. The method of claim 1, wherein the request data object comprises print stream data operable to facilitate the printing the physical document.

4. The method of claim 3, wherein the request data object further comprises a set of document metadata.

5. The method of claim 4, wherein the request data object further comprises a set of actionable data.

6. The method of claim 5, wherein the request data object further comprises a set of indications of preferences set by the intended recipient.

7. The method of claim 1, wherein reconciling the set of tracking information in at least one of the physical delivery platform or the electronic delivery platform comprises:
   determining that all instances of the set of tracking information are consistent in at least one of the physical delivery platform or the electronic delivery platform.

8. An apparatus comprising a processor and a memory, the memory storing computer program code that, when executed by the processor, causes the apparatus to:
   receive from a request source, a set of document information associated with an intended recipient;
   associate the set of document information with a digital stamp, the digital stamp operable to confer at least one of a right to print and deliver a physical document to the intended recipient and a right to transmit a digital version of the physical document to the intended recipient;
   reconcile a set of tracking information in at least one of a physical delivery platform or an electronic delivery platform, wherein the set of tracking information comprises at least an authentication token associated with the digital stamp, the digital stamp being associated with the set of document information and a corresponding communication of one of the physical document or the digital version of the physical document;
   in an instance in which the digital stamp confers the right to print and deliver a physical document to the intended recipient, based at least in part on the set of document information associated with the intended recipient, print the physical document and provide the physical document to the physical delivery platform for delivery to the intended recipient; and
   in an instance in which the digital stamp confers the right to transmit the digital version of the physical document to the intended recipient, based at least in part on the set of document information, generate a request data object comprising an image of the physical document and transmit the request data object to the electronic delivery platform for delivery to the intended recipient.

9. The apparatus of claim 8, wherein one or both of the physical delivery platform and the electronic delivery platform is associated with a first delivery agent.

10. The apparatus of claim 8, wherein the request data object comprises print stream data operable to facilitate the printing the physical document.

11. The apparatus of claim 10, wherein the request data object further comprises a set of document metadata.

12. The apparatus of claim 11, wherein the request data object further comprises a set of actionable data.

13. The apparatus of claim 12, wherein the request data object further comprises a set of indications of preferences set by the intended recipient.

14. The apparatus of claim 8, wherein the memory further stores computer program code that, when executed by the processor, causes the apparatus to reconcile the set of tracking information in at least one of the physical delivery platform or the electronic delivery platform by causing the apparatus to:
   determine that all instances of the set of tracking information are consistent in at least one of the physical delivery platform or the electronic delivery platform.

15. A computer program product comprising a computer-readable storage medium comprising computer program code that, when executed by a processor, causes the processor to at least:
   receive from a request source, a set of document information associated with an intended recipient;
   associate the set of document information with a digital stamp, the digital stamp operable to confer at least one of a right to print and deliver a physical document to the intended recipient and a right to transmit a digital version of the physical document to the intended recipient;
   reconcile a set of tracking information in at least one of a physical delivery platform or an electronic delivery platform, wherein the set of tracking information comprises at least an authentication token associated with the digital stamp, the digital stamp being associated with the set of document information and a corresponding communication of one of the physical document or the digital version of the physical document;
   in an instance in which the digital stamp confers the right to print and deliver a physical document to the intended recipient, based at least in part on the set of document information associated with the intended recipient, print the physical document and provide the physical document to the physical delivery platform for delivery to the intended recipient; and
   in an instance in which the digital stamp confers the right to transmit the digital version of the physical document to the intended recipient, based at least in part on the set of document information, generate a request data object comprising an image of the physical document and transmit the request data object to the electronic delivery platform for delivery to the intended recipient.

16. The computer program product of claim 15, wherein at least one of the physical delivery platform and the electronic delivery platform is associated with a first delivery agent.

17. The computer program product of claim 15, wherein the request data object comprises print stream data operable to facilitate the printing the physical document.

18. The computer program product of claim 17, wherein the request data object further comprises at least one of a set of document metadata and a set of actionable data.

19. The computer program product of claim 18, wherein the request data object further comprises a set of indications of preferences set by the intended recipient.

20. The computer program product of claim 15, wherein the computer-readable storage medium further comprises computer program code that, when executed by a processor, causes the processor to reconcile the set of tracking information in at least one of the physical delivery platform or the electronic delivery platform by causing the processor to at least:
   determine that all instances of the set of tracking information are consistent in at least one of the physical delivery platform or the electronic delivery platform.

\* \* \* \* \*